Aug. 14, 1956     W. M. BURROFF     2,758,842
SEED BROADCASTER
Filed Oct. 1, 1952     2 Sheets-Sheet 1
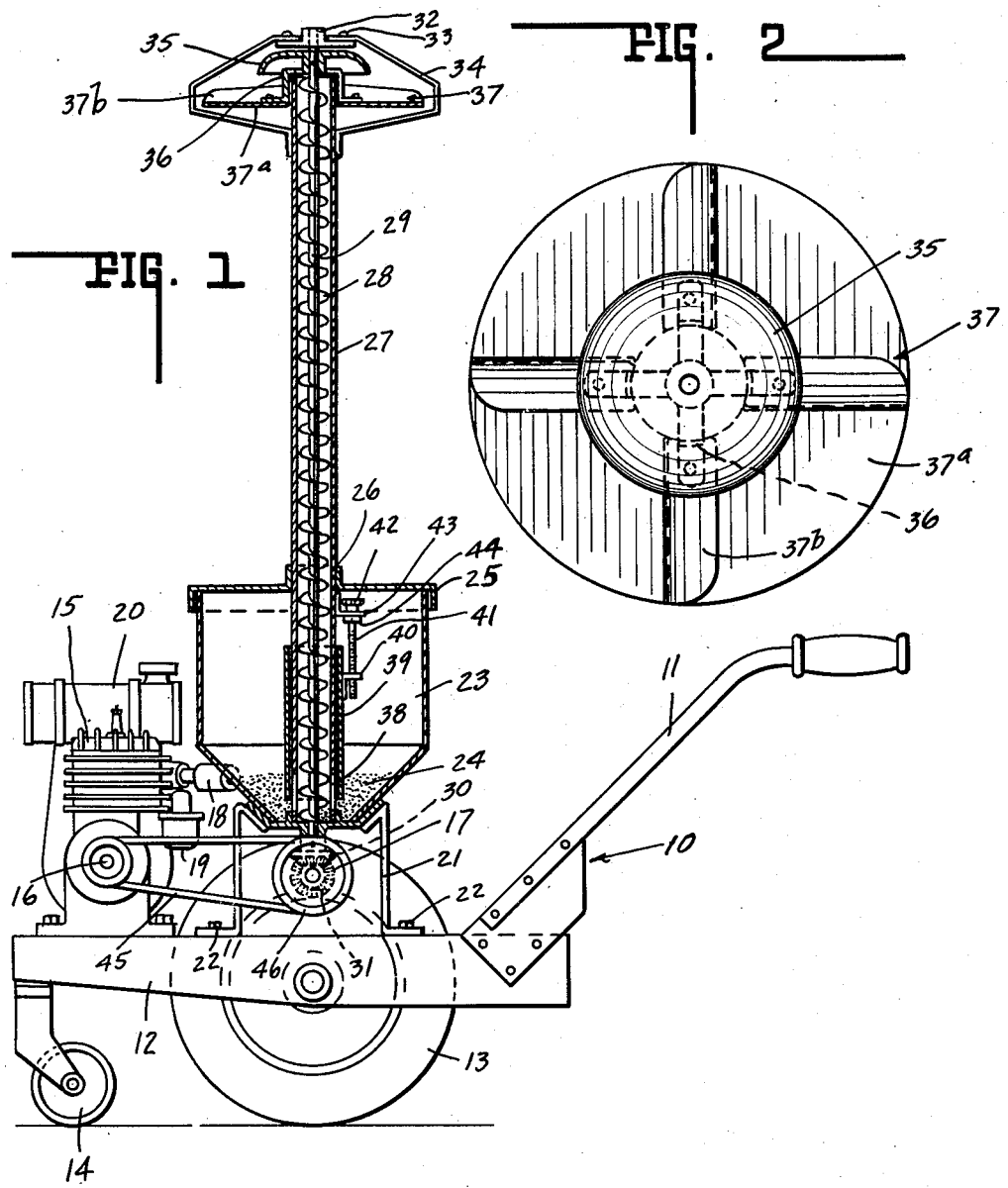
INVENTOR.
WILLIAM M. BURROFF.
BY
Lockwood, Galt, Woodard & Smith
ATTORNEYS

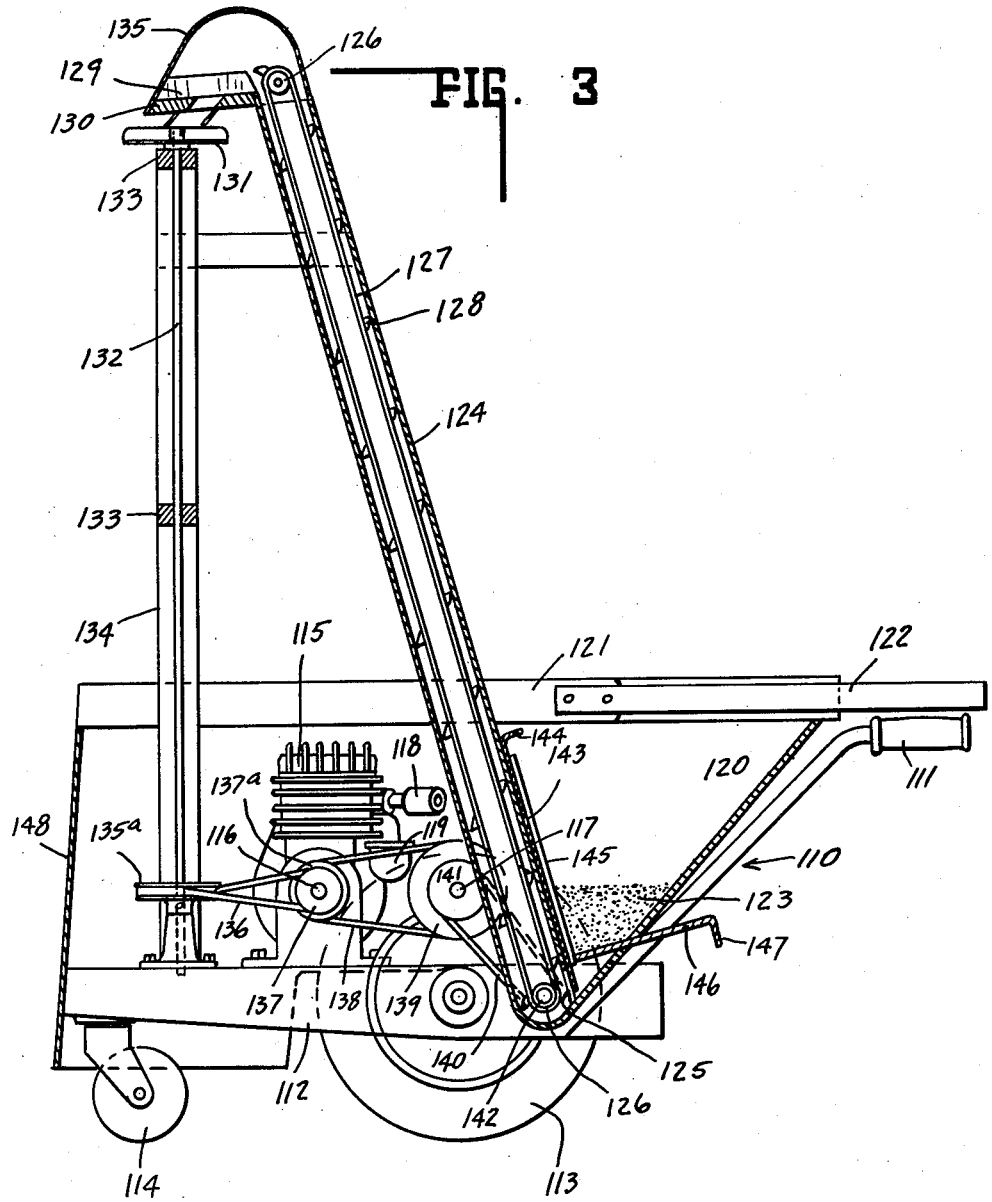

United States Patent Office 2,758,842
Patented Aug. 14, 1956

2,758,842

SEED BROADCASTER

William M. Burroff, Waveland, Ind.

Application October 1, 1952, Serial No. 312,491

3 Claims. (Cl. 275—8)

This invention relates to a seed broadcaster and more particularly to an attachment for garden tractors and the like that will broadcast seed in the midst of growing crops.

Heretofore insofar as is known, there has been no device on the market for the sowing of seed between rows of growing crops such, by way of illustration only and not by way of limitation, as tall matured corn. Yet there are several reasons why it is desirable to sow seed between rows of growing crops, and why it is necessary to have devices or mechanisms to accomplish that end. In the first place the problem of soil erosion, particularly during winter months, is reduced if not entirely avoided through the sowing of seed between rows of growing crops. In the second place the soil lying between the rows is made use of instead of wasted. For example, it is possible to sow rye, vetch, sweet clover, alfalfa or similar seed between the rows and later to harvest the matured crop and sell it for profit or as an alternative to plow the crop under, as desired. In the third place by crop rotation it is possible to replenish the supply of constituent elements in the soil which have been "drained off" by other crops. It is, therefore, the primary object of this invention to provide a device which will make possible the sowing of seed for the above purposes between rows of growing crops such as corn, soy beans, cotton and the like.

It is a further object of the present invention to provide an attachment which is of such character and construction that it will add little weight to the ordinary garden tractor, thereby making possible the use of the tractor and attachment to broadcast fertilizer even in wheat and the like without damage to the crops.

It is a still further object of the present invention to provide a device of such character and construction that the seed broadcast therefrom will span a substantial number of rows of the growing crop such as corn or the like. As a result of this construction it is obvious that less time will be taken to broadcast the seed.

It is a still further object of the present invention to provide a device which is simple and inexpensive in construction and which is nonetheless sufficiently sturdy and durable to withstand the stresses and strains attending its normal use.

The full nature of the invention will be understood from the accompanying drawings and the following description and claims:

Fig. 1 is a side elevation view of the invention with the hopper, elevator shaft and portions of said broadcasting mechanism shown in section.

Fig. 2 is a top plan view of the seed deflector and broadcaster portion of the invention.

Fig. 3 is a side elevation view of a modification of the invention with parts thereof shown in section.

In the drawings the preferred embodiment of the invention is, as stated, shown in Fig. 1. The attachment which comprises the present invention is shown in section mounted upon a conventional garden tractor shown generally at 10. No claim is made per se to the tractor which comprises the handles 11, the chassis 12, the rear wheels 13, the front caster wheel 14, the motor shown generally at 15, the motor shaft 16, the transmission shaft 17, the exhaust 18, the carburetor 19 and the gasoline tank 20.

In order to support the attachment the brackets 21 are provided. These are secured to the chassis 12 by the screws 22 or other suitable means. The seed hopper 23 is nested within and supported by the brackets as shown. The seed 24 is placed within the hopper through the vertically adjustable closure 25. Extending through an aperture 26 formed in the closure and resting upon the base of the hopper is the cylindrical casing 27 within which is rotatable the conveyor 28 having shaft 29, a portion of the lower end of which extends through the hopper bottom. Secured to the lower extremity of the shaft is the miter gear 30 which meshes with the miter gear 31 that is keyed to the transmission shaft and rotates therewith. As will be observed by reference to Fig. 1, that portion of the casing that projects from the hopper is approximately twice as long as the height of the hopper, and projects to a substantial height above the hopper. Thus the seed broadcasting mechanism hereinafter described can operate effectively above tall matured corn or the like.

The upper extremity of the conveyor shaft extends beyond the cylindrical casing and is rotatably supported in a bearing 32. This bearing is suitably connected at 33 to a spider 34. Positioned immediately below the bearing is the deflector element 35 which envelopes the shaft 29 and is keyed thereto. A portion of the deflector serves as a hub 36 connected to the fan or spreader 37 which rotates about the cylindrical casing. The fan comprises an annular base 37a and a plurality of blades 37b which are substantially U-shaped in vertical cross section.

The lower portion of the cylindrical casing has an opening 38 formed therein to provide an inlet for the seed. In order to control the volume of seed being fed to the conveyor there is provided a vertically adjustable sleeve 39 which envelopes and embraces the casing adjacent its lower extremity and within the hopper. An angle 40 is secured to the sleeve to make possible its vertical adjustment. Extending through a threaded aperture formed within the horizontal portion of the angle is a threaded bolt 41 having a knurled head 42 which is supported by a second angle 43 connected to the casing above the sleeve. As is apparent from Fig. 1, the head of the threaded bolt is freely rotatable relative to angle 43, but by reason of the nut 44 positioned on the opposite side of the angle to the head, the threaded bolt does not move vertically. Instead, upon its rotation, the angle 40 and sleeve 39 are caused to move up or down, depending upon the direction of rotation of the threaded bolt. In such manner the size of the entrance or inlet from the hopper into the casing is controlled and with it the supply of seed that is fed to the conveyor.

In operation, as the garden tractor is guided between rows of corn or other crops the motor powering it will also power the seed conveyor. This is accomplished in the following manner: The power from the motor shaft 16 is transferred through the V-belt 45 to the transmission shaft 17 through the medium of the pulley 46 which is secured to that shaft. The miter gear 31 also secured to the transmission shaft rotates miter gear 30 secured to conveyor shaft 29 thereby rotating it and causing the seed to be augered upwardly within the casing. The upward motion of the seed is normally of such speed that it will be thrown out of the casing against the downwardly inclined sides of the deflector whereupon the seed will fall upon the spreader or fan and will be broadcast therefrom to the surrounding area.

A modification of the invention is shown in Fig. 3 wherein the garden tractor is indicated generally at 110, it having the handles 111, the chassis 112, the wheels 113, the caster wheel 114, an internal combustion engine shown generally at 115, the motor shaft 116, the transmission shaft 117, the exhaust 118 and the carburetor 119. A hopper 120 is supported upon the chassis of the garden tractor and includes the side rails 121 having the extensions 122 which are disposed slightly outwardly of the longitudinal plane of either garden tractor handle so as to protect the hands of the operator from being scratched by the growing crop as the tractor is moved between the rows. In short, the extension serves as a breaker or shield for the hands and arms of the operator.

The seed to be sown is shown at 123 within the hopper. Extending upwardly from within the hopper and projecting through the top thereof is the casing 124 which has an opening 125 adjacent the bottom of the hopper to permit seed to be fed by gravity therewithin. Mounted within the casing and trained about the pulley 126 is the endless conveyor belt 127 having a plurality of flights or buckets 128 connected thereto in the conventional manner. As seed is fed by gravity within the casing it is scooped up by the flights and carried to the top of the endless conveyor where it is cast outwardly from the buckets or flights onto the deflector plate 129 located adjacent the upper extremity of the conveyor. The deflector is provided with baffles 130 to direct the falling seed upon the spreader or fan 131. This fan is carried by the shaft 132 which is suitably supported by bearings 133 which are in turn connected by the frame work 134 supported by the chassis of the tractor. It will be observed that a hood 135 is formed at the upper extremity of the cylindrical casing, this hood serving the purpose of protecting the endless conveyor from the elements and directing the seed upon the deflector as it is thrown out of the flights or buckets.

The shaft 132 which rotates the spreader has keyed thereto the horizontally disposed pulley 135a. This pulley is rotated by the V-belt 136 which is trained about a pulley 137 connected to the motor shaft 116. A second pulley 137a is secured to said shaft adjacent said pulley 137. V-belt 138 is trained about said last mentioned pulley and about pulley 139 secured to transmission shaft 117. In order to actuate the endless conveyor a V-belt 140 is trained about pulley 141, also secured to the transmission shaft and rotated thereby, and about pulley 142.

The supply of seed fed to the endless conveyor is controlled by the vertically movable shutter 143 having a handle 144. The shutter is slidable between the plate 145 and the wall of the casing 124. In the event it should be desired to shut off the supply of seed earlier than is possible through the movement of shutter 143, there is provided a substantially horizontal but slightly inclined shutter 146 having the handle 147.

In operation the garden tractor is guided between rows of corn or the like which the apron or shield 148 brushes to one side to permit movement therebetween of the tractor. The motor powers the endless conveyor and spreader or fan as well as the tractor. Seed is carried from the hopper up the conveyor to the hood and to the deflector whereupon it falls down upon the spreader and is broadcast to the surrounding area.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. The combination with an engine-powered farm vehicle including a motor shaft, of a seed broadcaster attachment comprising a seed hopper mounted upon said vehicle, an elongated casing having an open top and extending upwardly from within said hopper to a point substantially thereabove, said casing having a seed admitting opening formed in the wall thereof adjacent the bottom of said hopper to provide communication between said hopper and the interior of said casing, a conveyor screw mounted within said casing and including a shaft having a driving connection with said motor shaft, and a combined seed deflector and spreader fixedly secured to said shaft adjacent the open top of said casing for rotation with said shaft.

2. The combination with an engine-powered farm vehicle including a motor shaft, of a seed broadcaster attachment comprising a seed hopper mounted upon said vehicle, an elongated casing having an open top and extending upwardly from within said hopper to a point substantially thereabove, said casing having a seed admitting opening formed in the wall thereof adjacent the bottom of said hopper to provide communication between said hopper and the interior of said casing, an adjustable closure operably associated with said opening, a conveyor screw mounted within said casing and including a shaft having a driving connection with said motor shaft, and a combined seed deflector and spreader fixedly secured to said shaft adjacent the open top of said casing for rotation with said shaft.

3. The combination with an engine-powered farm vehicle including a motor shaft, of a seed broadcaster attachment comprising a seed hopper mounted upon said vehicle, an elongated casing having an open top and extending upwardly from within said hopper to a point substantially thereabove, said casing having a seed admitting opening formed in the wall thereof adjacent the bottom of said hopper to provide communication between said hopper and the interior of said casing, a conveyor screw mounted within said casing and including a shaft extending beyond both ends of said casing, the lower end of said conveyor shaft including gear means having driving connection to said motor shaft, the upper end of said conveyor shaft having a combined seed deflector and spreader member fixedly secured thereto for rotation therewith, the deflector portion of said member being positioned slightly above said open top and the spreader portion being located slightly below said open top.

References Cited in the file of this patent

UNITED STATES PATENTS

| | | |
|---|---|---|
| 272,046 | Henris | Feb. 13, 1883 |
| 1,305,500 | Steele | June 3, 1919 |
| 1,623,001 | Gollbach | Mar. 29, 1927 |
| 2,340,657 | Goertzen | Feb. 1, 1944 |
| 2,401,465 | Cwicig | June 4, 1946 |
| 2,490,971 | Lawson et al. | Dec. 13, 1949 |
| 2,521,888 | Wilson | Sept. 12, 1950 |